United States Patent [19]

Platus

[11] Patent Number: 5,178,357
[45] Date of Patent: Jan. 12, 1993

[54] VIBRATION ISOLATION SYSTEM

[76] Inventor: David L. Platus, 11775 Gateway Blvd., #6, Los Angeles, Calif. 90064

[21] Appl. No.: 708,995

[22] Filed: May 31, 1991

Related U.S. Application Data

[63] Continuation-in-part of Ser. No. 681,808, Apr. 8, 1991, which is a continuation-in-part of Ser. No. 395,093, Aug. 16, 1989.

[51] Int. Cl.⁵ .............................................. F16M 13/00
[52] U.S. Cl. ..................................... 248/619; 248/638
[58] Field of Search ............... 248/638, 619, 620, 621, 248/603, 604, 632, 565, 576

[56] References Cited

U.S. PATENT DOCUMENTS

| | | | |
|---|---|---|---|
| 2,924,420 | 2/1960 | Fink | 248/632 X |
| 4,572,471 | 2/1986 | Schrepfer | 248/618 X |
| 4,643,385 | 2/1987 | Sandercock | 248/638 X |
| 4,711,135 | 12/1987 | Horiuchi et al. | 248/638 X |
| 4,871,142 | 10/1989 | DeMey | 248/638 X |
| 5,040,764 | 8/1991 | DuBois | 248/638 X |

*Primary Examiner*—Ramon O. Ramirez
*Attorney, Agent, or Firm*—Fulwider Patton Lee & Utecht

[57] ABSTRACT

An improved vibration isolation system utilizes at least one pair of structures connected vertically in series with each other and with a base structure and preloaded vertically, with a payload platform disposed between and connected to the structures. Each structure has a negative-stiffness effect in response to vertical compressive load for reducing its horizontal stiffness. The system passively accommodates changes in payload weight or weight distribution by providing a prescribed change in horizontal-motion isolator stiffness with change in weight load. The invention also provides an improved means of retrofitting existing vibration-isolating suspension systems to reduce their stiffness and increase their damping.

11 Claims, 5 Drawing Sheets

VIBRATION ISOLATION SYSTEM

This application is a continuation-in-part of co-pending application Ser. No. 681,808, filed April 8, 1991, entitled "DAMPED VIBRATION ISOLATION SYSTEM" which is a continuation-in-part of co-pending application Ser. No. 395,093, filed Aug. 16, 1989, entitled "VIBRATION ISOLATION SYSTEM".

BACKGROUND OF THE INVENTION

1. Field of the Invention

This invention relates generally to suspension systems and methods for isolating and reducing the transmission of vibratory motion between an object and a base and, more particularly, to an omnidirectional vibration isolation or suspension system that exhibits low stiffness, high damping to limit resonant responses of the system, effective isolation at the higher frequencies, and can accommodate changing weight loads without significantly degrading isolation system performance. The present invention can also be retrofitted to existing vibration-isolating suspension systems to improve their performance.

2. Description of Related Art

The problems caused by unwanted vibration on motion-sensitive equipment and devices have been widely researched and numerous solutions to prevent or reduce the transmission of vibratory motion have been proposed and developed. Many of the devices designed to reduce the transmission of unwanted vibration between an object and its surroundings, commonly called vibration isolators or suspension devices, have utilized various combinations of elements such as resilient pads made from a variety of materials, various types of mechanical springs, and pneumatic devices. There are, however, serious shortcomings and disadvantages associated with these particular prior art isolation systems which prevent them from obtaining low system natural frequencies and from limiting resonant responses to low values while providing high isolation performance at the higher frequencies.

These shortcomings and disadvantages of prior art systems were addressed through my development of novel vibration isolation system described in my co-pending application Ser. No. 395,093, filed Aug. 16, 1989, entitled "VIBRATION ISOLATION SYSTEM", and my co-pending application, Ser. No. 681,808, filed Apr. 8, 1991, entitled "DAMPED VIBRATION ISOLATION SYSTEM", which are both hereby incorporated by reference in this present application. The particular vibration isolation system described in my co-pending applications and utilized in connection with the present invention provides versatile vibration isolation by exhibiting low stiffness in an axial direction (generally the direction of the payload weight) and any direction substantially transverse to the axial direction (generally a horizontal direction). The particular system utilizes a combination of isolators that can be connected together axially in series to provide omnidirectional isolation. Each isolator is designed to isolate either the axial or the transverse component of any vibratory motion to effectively isolate vibrations in all directions. In subsequent discussions, an axial-motion isolator will be referred to as a vertical-motion isolator, and the system of axial-motion isolators will be referred to as the vertical-motion isolation system. Similarly, a transverse-motion isolator will be referred to as a horizontal-motion isolator, and the system of transverse-motion isolators will be referred to as the horizontal-motion isolation system.

Each isolator relies on a principle of loading a particular elastic structure which forms the isolator or a portion of it (the loading being applied by either the supported weight or by an external loading mechanism) to approach the elastic structure's point of elastic instability. This loading to approach this point of elastic instability, also called the "critical buckling load" of the structure, causes a substantial reduction of either the vertical or the horizontal stiffness of the isolator to create an isolation system that has low stiffness (that can be made zero or near zero) in the vertical and in any horizontal direction, and increases the damping inherent in the structure. While stiffness is reduced, these isolators still retain the ability to support the payload weight.

If the load on an elastic structure with an instability is greater than the critical buckling load, the excessive load will tend to propel the structure into its buckled shape, creating a "negative-stiffness" or "negative-spring-rate" mechanism. By combining a negative-stiffness mechanism with a spring, adjusted so that the negative stiffness cancels or nearly cancels the positive stiffness of the spring, one obtains a the resulting device that can be placed at or near its point of elastic instability. The magnitude of the load causing the negative stiffness can be adjusted, creating an isolator that can be "fine tuned" to the particular stiffness desired.

Many applications of my vibration isolation system involve changing weight loads. Examples are optical tables that support optical instruments of various weights and various weight distributions on the tables; photolithography machines with stages that translate and change the weight distributions of the machines; and isolated floors that support equipment of various weights and various weight distributions. It is thus desirable for the isolation system to accommodate changes in the weight distributions passively, with minimum added complexity and with minimum degradation in isolation system performance.

In order to maintain the performance of the isolation system under the changing weight loads, it is also desirable for the stiffness of the isolators to change in some prescribed manner with change in weight load. For example, if the isolation system stiffness changes in the same proportion as changes in the payload weight, the system resonant frequency remains unchanged, and the resulting transmissibility vs. frequency ratio curve remains unchanged. As another example, consider a "CG system", i.e., a vibration-isolating suspension system in which the resultant of the isolator forces passes through the center of gravity of the payload. For such a system, a purely translational excitation produces a purely translational response. This configuration is desirable because it minimizes the payload response for a given excitation. (A "non-CG system" produces translational-rotational coupling, i.e., a purely translational excitation produces a combined translational and rotational response of the payload, with a maximum response greater than that of a CG system). In a CG system, if the isolator stiffnesses change in the same proportion as the changes in weight supported by each isolator, the system tends to remain a CG system under a changing payload weight distribution. Accordingly, for many systems it is desirable that the stiffness of an isolator increase in the same proportion as changes in the payload weight supported by the isolator.

Many existing vibration-isolating suspension systems could benefit from reduced suspension system stiffness in order to reduce system natural frequencies and improve isolation system performance by isolating at lower frequencies and by isolating more effectively at higher frequencies, or that could benefit from increased damping in order to reduce isolation system resonant responses, or that could benefit from both reduced stiffness and increased damping. Accordingly, there is a need for an improved means for practically and effectively retrofitting existing vibration-isolating suspension systems in order to reduce the system stiffness or to increase the system damping, or to both reduce the system stiffness and increase the system damping. It is desirable that such retrofitting means would not disturb the existing system, or disturb it as little as possible by displacing it from its equilibrium position or by requiring changes in the existing system such as adding or removing weight.

SUMMARY OF THE INVENTION

The present invention provides a novel means for passively accommodating changes in payload weight and payload weight distribution in my horizontal-motion vibration isolation system. With the present invention, the horizontal stiffness of a horizontal-motion isolator can be made to change passively in response to changes in weight load, and the change in stiffness with change in weight load can be made to occur in a prescribed manner. The horizontal stiffness can be made to change approximately in proportion to change in weight load, and the proportionality constant can be prescribed. Also, the system can be designed so that the isolator horizontal stiffness remains essentially unchanged with change in weight load.

The present invention also provides an improved means for practically and effectively retrofitting existing vibration-isolating suspension systems for reducing system stiffness and increasing system damping. The improved means utilizes an improved horizontal-motion retrofit device that is operatively connected between the isolated payload and the base on which the existing suspension system is mounted. The retrofit device does not exert any significant steady load on the existing system, and does not require any changes in the existing system such as adding or removing weight.

A typical horizontal-motion isolator for a system in which the weight load is changing, made in accordance with the present invention, utilizes two structures, a primary structure and a secondary structure, each having a vertical axis, and configured with the structures pre-compressed in series along their vertical axes. The structures are relatively stiff in the vertical direction and flexible for relative horizontal displacements of their upper and lower ends without rotation of their ends, but each structure has some vertical flexibility. Each structure has an instability point or buckling strength in response to vertical compressive load, with instability mode shapes such that small displacements of the structure into an instability mode shape correspond to relative horizontal displacements of the upper and lower ends of the structure. The instability point or buckling strength of one of the structures can correspond to zero compressive load, i.e., the structure by itself can be unstable for any vertical compressive load and its horizontal stiffness in response to relative horizontal displacement of its upper and lower ends without rotation of its ends can be negative. (An example is a vertical post with spherical ends vertically compressed between two horizontal plates.) At least one of the structures has positive horizontal stiffness in response to relative horizontal displacement of its upper and lower ends without rotation. Because of the instability points and the vertical compressive loads, the structures act as negative-stiffness mechanisms for relative horizontal displacements of their upper and lower ends, but the net horizontal stiffness of each structure can be positive or negative as explained above. Increase in the vertical compressive load on each structure increases the negative-stiffness effect and subtracts horizontal stiffness; decrease in the vertical compressive load on each structure decreases the negative-stiffness effect and adds horizontal stiffness.

As used here and in subsequent discussions, a loaded structure having an instability at some value of the applied load is referred to as a stiffness-reducing mechanism or negative-stiffness mechanism, and the resulting reduction in stiffness is referred to as the negative-stiffness effect. This terminology applies even if the net stiffness of the structure is positive. An example is a beam-column with an axial load less than the critical buckling load. The net transverse bending stiffness is positive but it is less than the bending stiffness without the axial load. The axially loaded beam-column is referred to as a negative-stiffness mechanism and the reduction in bending stiffness caused by the axial load is referred to as the negative-stiffness effect.

The lower end of the primary structure and the upper end of the secondary structure are connected to a base. The upper end of the primary structure and the lower end of the secondary structure are connected to a platform that supports the payload or to a platform that supports a vertical isolator or a set of vertical isolators that support the payload. The primary structure supports a portion of the payload weight in addition to the compressive preload on the secondary structure.

Since the structures have some vertical flexibility, a change in payload weight causes changes in the compressive loads on both structures, but in opposite directions. An increase in weight load increases the compressive load on the primary structure and decreases the compressive load on the secondary structure; a decrease in weight load decreases the compressive load on the primary structure and increases the compressive load on the secondary structure. Because of the changes in negative-stiffness effects with changes in compressive load, the resulting changes in horizontal stiffness of the primary and secondary structures with change in weight load are in opposite directions. For example, an increase in weight load decreases the horizontal stiffness of the primary structure and increases the horizontal stiffness of the secondary structure; a decrease in weight load increases the horizontal stiffness of the primary structure and decreases the horizontal stiffness of the secondary structure.

The net increase or decrease in horizontal stiffness of the isolator with change in weight load depends on the various design parameters of the two structures such as the uncompressed horizontal stiffness, the critical buckling loads and the relative vertical stiffness. By proper design, the net horizontal stiffness of the isolator can be made to change approximately in direct proportion with the change in weight load, and the change can be positive or negative. The magnitude of the change in horizontal stiffness of the isolator with change in weight load can also be established by the design, including the case where the change is approximately zero so that the horizontal stiffness of the isolator is approximately insensitive to changes in weight load.

In one particular form of a horizontal-motion isolation system made in accordance with the present invention, the isolator comprises three pairs of primary and secondary column assemblies that support an intermediate platform. Three such isolators support a payload platform. The primary column assembly is located under the intermediate platform and is connected between the intermediate platform and a base platform. The secondary column assembly is located above the primary column assembly with its upper end connected to a rigid post structure that is rigidly attached to the base platform, and with its lower end connected to the intermediate platform. Each column assembly can use, for example, a post with spherical ends in series with a spring that provides added vertical flexibility. A polymeric rubber-like material damper is added to the primary column assembly in the form of an annular element bonded to the post near its lower end and bonded to the walls of a cavity defined in the base platform. A steel coil spring surrounds the primary column assembly post and connects to the intermediate and to the base platforms in order to add horizontal stiffness so as to avoid a potential creep instability. A loading screw applies a vertical compressive preload to the posts and can be used to adjust the net horizontal stiffness of the column assembly pair, and the horizontal stiffness of the isolator.

Another embodiment of a horizontal-motion isolation system made in accordance with the present invention uses the same general arrangement as the one described above except the secondary column assembly is located laterally adjacent to the primary column assembly by means of a rigid post structure that extends down from the intermediate platform. This embodiment provides a low-profile configuration.

Still another embodiment of a horizontal-motion isolation system made in accordance with the present invention uses the same general arrangement as the first one described above except that flexible columns are used instead of rigid posts pivoting on spherical ends, and one horizontal-motion damper assembly is added for each three pairs of column assemblies, the damper assembly being in the form of a cylindrical element of damping material operatively connected between the intermediate platform and a rigid post structure connected to the base platform.

An embodiment of an omnidirectional vibration-isolation system made in accordance with the present invention uses the same general arrangement as the first horizontal-motion isolation system described above, except a vertical-motion isolator is connected in series between each horizontal-motion isolator and the payload platform. The vertical-motion isolator uses a configuration that can be made in accordance with my invention described in my co-pending applications, and includes a central hub supported on a coil spring and connected in parallel with a negative-stiffness mechanism in the form of three radially oriented and radially loaded posts with spherical ends that are operatively connected between the central hub and loading screws that are threaded into openings in rigid supports connected to the intermediate platform. A Belleville spring and washer is used in series between each post and each loading screw, and an annular damper element surrounds each post near its inner end and is bonded to the post and to the walls of a cavity defined in the central hub.

The three embodiments of horizontal-motion isolation systems described above could also be used to retrofit existing horizontal-motion vibration-isolating suspension systems with changing payload weight or changing payload weight distributions to reduce their stiffnesses and to add damping. The coil springs that provide added positive horizontal stiffness could be eliminated since positive horizontal stiffness is provided by the existing systems. The omnidirectional system described above could be used to retrofit an existing omnidirectional vibration-isolating suspension system with changing payload weight to reduce its stiffness and add damping.

If the existing suspension system being retrofitted does not have changing payload weight or changing payload weight distribution, the retrofit system only needs a stiffness-reducing mechanism in either the primary or the secondary structure of the horizontal-motion isolation system. However, the other structure must be relatively stiff in the vertical direction and flexible in the horizontal direction for relative horizontal displacement of its upper and lower ends without rotation of the ends. An embodiment of a system made in accordance with the present invention for retrofitting an existing omnidirectional vibration-isolating suspension system without changing payload weight or payload weight distribution utilizes the same general configuration as the omnidirectional retrofit system described above, but with some modifications. In one embodiment, the secondary column assembly can be replaced by a bridge-bearing-type spring that has high vertical stiffness and low horizontal stiffness. Also, the coil springs used in the previous omnidirectional system can be eliminated; flexible beam-columns are used in place of posts with spherical ends for the primary column assembly in the horizontal-motion isolator and for the negative-stiffness mechanism in the vertical-motion isolator; and horizontal-motion and vertical motion damper elements can be connected between the intermediate platform and the base platform and between the central hub and the intermediate platform, respectively, in place of the damper elements in the omnidirectional retrofit system described above.

All in all, the present invention provides an improvement to the vibration isolation system described in my co-pending applications by providing a horizontal-motion isolation system that passively accommodates changes in payload weight with little or no significant degradation in horizontal-motion isolation system performance. It also provides an improved means for retrofitting existing vibration-isolating suspension systems by adding negative stiffness and damping without significantly disturbing or changing the existing systems. Other features and advantages of the present invention will become apparent from the following detailed description when taken in conjunction with the accompanying drawings which illustrate, by way of example, the principles of the present invention.

DETAILED DESCRIPTION OF THE PREFERRED EMBODIMENTS

As is shown in the drawings for purposes of illustration, the present invention is embodied in a horizontal-motion vibration isolation system that is capable of passively accommodating changes in payload weight and providing a prescribed change in isolation system horizontal stiffness in response to a particular change in payload weight, and that is capable of retrofitting existing vibration-isolating suspension systems by adding negative stiffness and damping without significantly disturbing or changing the existing systems. The present invention is also directed to omnidirectional vibration isolation systems and means for retrofitting existing omnidirectional vibration-isolating suspension systems. The present invention is further directed to the individual horizontal-motion isolators that include means for passively changing their horizontal stiffness in a prescribed manner in response to a particular change in the weight load on the isolator, and to the horizontal-motion retrofit devices that can add negative horizontal stiffness to an existing vibration-isolating suspension system without significantly disturbing or changing the existing system.

Figure 1:
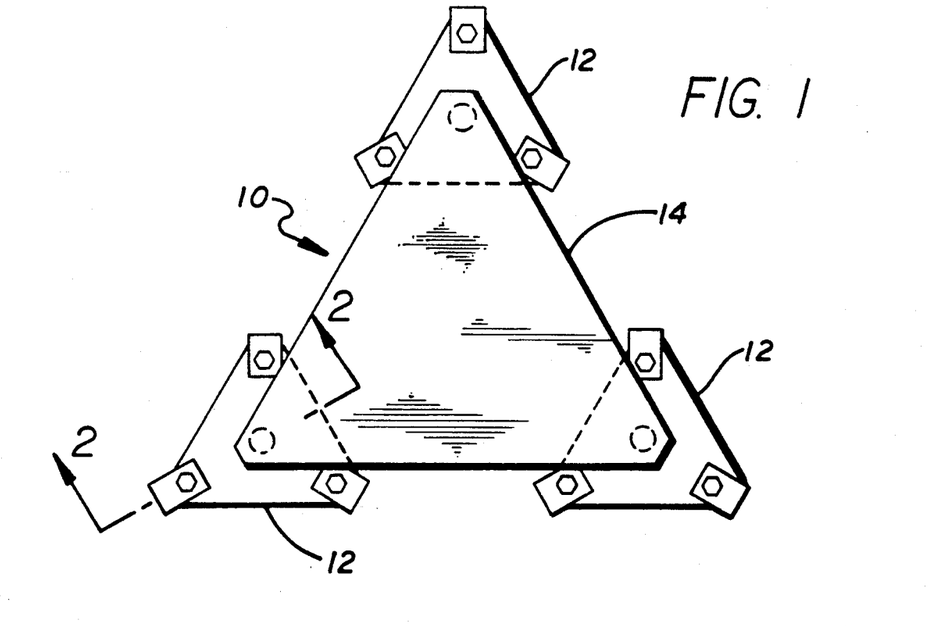
FIG. 1 is a plan view of one embodiment of a horizontal-motion vibration isolation system made in accordance with the present invention.

FIG. 1 shows one embodiment of a horizontal-motion isolation system 10 made in accordance with the present invention. The system 10 utilizes several novel horizontal-motion isolation apparatus or isolators 12 to resiliently support the object to be isolated from horizontal motions, and that passively change their horizontal stiffness in a prescribed manner in response to a particular change in vertical compressive load. In the system 10, three such isolators 12 support a payload platform 14.

Figure 2:
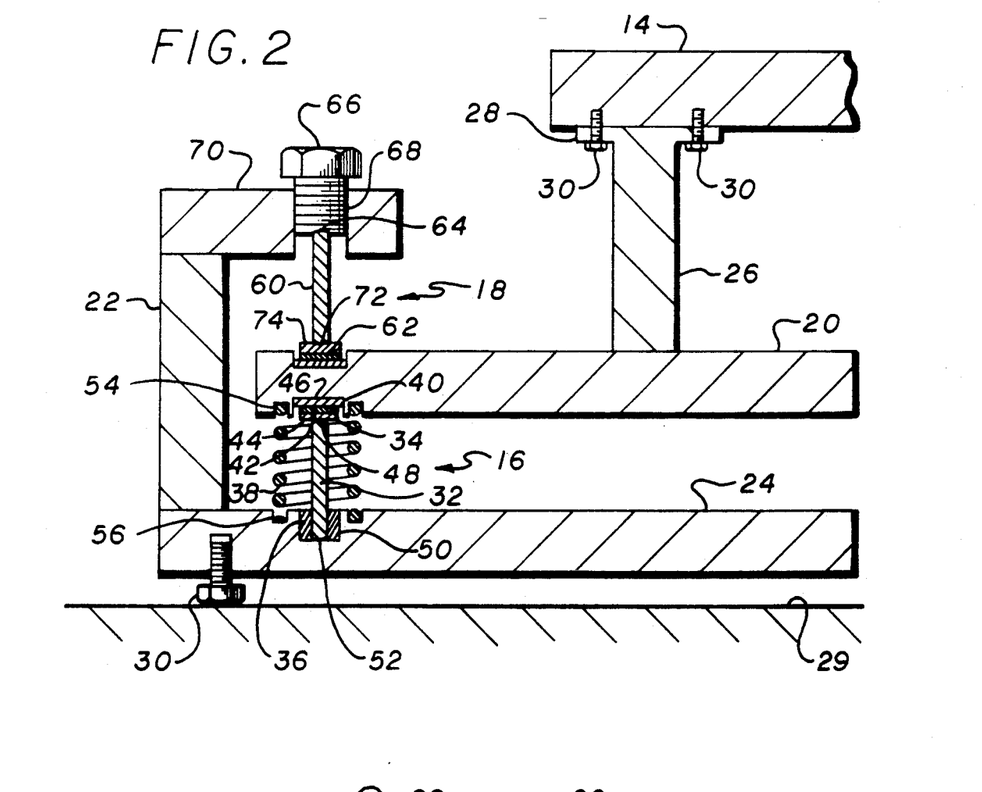
FIG. 2 is a partial cross-sectional side view of the embodiment shown in FIG. 1 taken along line 2—2.

Referring now to both FIGS. 1 and 2, one embodiment of a horizontal-motion isolator is illustrated. In this particular form, the horizontal-motion isolator 12 includes three pairs of primary column assemblies 16 and secondary column assemblies 18 (of which only one pair is shown in FIG. 2); an intermediate platform 20; and three support posts 22 (only one of which is shown in FIG. 2). The primary column assemblies 16 connect between a base platform 24 and the intermediate platform 20, and support the intermediate platform 20 and part of the weight load exerted on the intermediate platform by the payload platform 14 and the payload (not shown). A post 26 with flange 28 at its upper end is connected with bolts 30 to payload platform 14, and post 26 is joined at its lower end to intermediate platform 20, thereby transmitting part of the weight load of the payload and payload platform 14 to the intermediate platform 20. The base platform 24 connects to foundation 28 through three leveling screws 30 (only one of which is shown in FIG. 2). The other pairs of primary and secondary column assemblies, support posts and the loading screws would be positioned in the other corners of the base platform 24. All of these elements which are not shown would have the same structure as the corresponding elements disclosed and described herein.

The primary column assembly 16 includes a stiff post 32 with spherical ends, a bridge-bearing-type spring 34, an annular spring-damper element 36 made from a polymeric rubber-like material, and a steel coil spring 38. The bridge-bearing-type spring 34 is located in cavity 40 defined in platform 20 and comprises a rubber-like material layer 42 which is sandwiched between and bonded to two steel layers 44 and 46. The steel layer 46 is larger in diameter than the other layers and centers spring 34 in the cavity 40, allowing fee lateral shear deformation of the spring. The steel layer 44 has a shallow spherical cavity 48 that captures the upper end of post 32. The post 32 passes through and is bonded near its lower end to spring-damper element 36, that is located in and bonded to a cavity 50 defined in base platform 24. The lower end of post 32 is supported in a shallow spherical cavity 52 defined in the bottom of cavity 50. The coil spring 38 is captured at its upper and lower ends in annular grooves 54 and 56, defined in platforms 20 and 24, respectively.

The secondary column assembly 18 includes a stiff post 60 with spherical ends, and a bridge-bearing-type spring 62 that is similar to spring 34. The post 60 is captured at its upper end in a shallow spherical cavity 64 defined in the end of loading screw 66 which is threaded into opening 68 defined in the top section 70 of support post 22. The lower end of post 60 is captured in a shallow spherical cavity 72 defined in steel layer 74 of spring 62.

The loading screw 66 applies vertical compressive preload to the system of primary and secondary column assemblies 16 and 18 which are connected in series, loading posts 32 and 60 and bridge-bearing-type-springs 34 and 62. Some of the load could be carried by coil spring 38 but generally this spring will be much more flexible than springs 34 and 62 and therefore coil spring 38 will carry a negligible part of the vertical load. The purpose of coil spring 38 is to provide added horizontal stiffness to the isolator so as to avoid a potential creep problem that could occur if the only significant positive horizontal stiffness were due to the polymeric rubber-like spring-damper element 36, and the other similar spring-damper elements in the other primary column assemblies of the horizontal-motion isolator 12.

Under normal operation of the isolator, positive horizontal stiffness of the isolator in response to relative horizontal displacement between the intermediate platform 20 and the base platform 24 comes from the coil spring 38 and the spring-damper element 36 that deforms as post 32 tilts. (For extremely small displacements of platform 20 relative to platform 24, friction between the posts 32 and 60 and their supporting surfaces 48 and 52, and 64 and 72, respectively, may prevent the rods from tilting. Under these conditions, positive horizontal stiffness of the isolator may be due to the coil spring 38 and the rubber-like material layers in springs 34 and 62 that deform in lateral shear.) Negative horizontal stiffness is produced as a result of tilting of the vertically-loaded posts 32 and 60, which subtracts from the positive horizontal stiffness. The net horizontal stiffness of the isolator can be adjusted by adjusting the vertical compressive loads in the posts 32 and 60 with loading screw 66, and this stiffness can be made arbitrarily low.

The total weight load associated with the intermediate platform 20 (platform and attachments plus part of payload platform 14 plus part of payload) is supported on the primary column assembly post 32. Each post 32 carries a portion of this total weight plus the vertical compressive load on the secondary column assembly post 60. The vertical stiffness of a column assembly pair in response to vertical displacement of the intermediate platform 2 relative to the base platform 24 is approximately the sum of the vertical stiffnesses of the two column assemblies 16 and 18 since, under these conditions, the stiffnesses of the two assemblies act in parallel and the support post 22 and top section 70 are quite stiff. This vertical stiffness of the column assembly pair is essentially the sum of the stiffnesses of the bridge-bearing-type springs 34 and 62 since the posts are essentially rigid in comparison. An increase in weight load on the column assembly pair, due, for example, to a change or a redistribution in payload weight, cause a downward displacement of the platform 20 relative to the platform 24, based on the vertical stiffness described above. This displacement increases the compression of the primary column assembly spring 34 and increases the vertical compressive load on the primary column assembly post 32. This same displacement decreases the compression of the secondary column assembly spring 62 and decreases the vertical compressive load on the secondary column assembly post 60. The increased vertical compression on the primary column assembly post 32 increases the negative-stiffness effect of the primary column assembly 16, and the decreased vertical compression on the secondary column assembly post 60 decreases the negative-stiffness effect of the secondary column assembly 18.

The net change in horizontal stiffness of the column assembly pair (the primary and secondary column assemblies) due to the increase in weight load on the column assembly pair depends on the changes in negative-stiffness effect for the primary and secondary column assemblies. In this particular form of the invention, these negative-stiffness effects are determined essentially by the lengths of the primary and secondary column assembly posts 32 and 60 and the vertical stiffnesses of the primary and secondary column assembly springs 34 and 62. The relative lengths of the posts and the relative vertical stiffnesses of the springs determine whether the net change in horizontal-stiffness of a column assembly pair will be positive, negative or zero. This is illustrated by a few examples. Consider, first, that the lateral stiffness of the bridge-bearing-type springs 34 and 62 usually will be sufficiently high so that their lateral or horizontal deflections can be neglected in relating the tilt of the posts 32 and 60 to small relative horizontal displacements between the platforms 20 and 24. With this assumption, the negative-stiffness of a column assembly is the ratio of the vertical compressive load to the length of the post, and the change in negative-stiffness is the ratio of the change in vertical compressive load to the length of the post. As a first example, consider primary and secondary column assembly posts of equal length but with the primary column assembly spring 34 much stiffer vertically than the secondary column spring 62. For this example, an increase in weight load on the column assembly pair increases the vertical compressive load on the primary column assembly post 32 by approximately the increase in weight load, with a negligible decrease in vertical compressive load on the secondary column assembly post 60. Consequently, the negative-stiffness effect for the primary column assembly 16 increases, with little change in the negative-stiffness effect for the secondary column assembly 18, so the net change in stiffness for the column assembly pair is negative, and its magnitude is approximately the change in weight load divided by the primary column assembly post length. As a second example, consider, again, primary and secondary column assembly posts of equal length but with the secondary column assembly spring 62 much stiffer vertically than the primary column assembly spring 34. For this second example, an increase in weight load on the column assembly pair decreases the vertical compressive load on the secondary column assembly post 60 by approximately the increase in weight load, with a negligible increase in the vertical compressive load on the primary column assembly post 32. Consequently, the negative stiffness effect for the secondary column assembly 18 decreases, with little change in the negative-stiffness effect for the primary column assembly 16, so the net change in horizontal stiffness for the column assembly pair is positive, and its magnitude is approximately the change in weight load divided by the secondary column assembly post length. As a third example, consider primary and secondary column assembly posts of equal length and springs of equal vertical stiffness. For this example, a change in weight load on the column assembly pair causes changes in vertical compressive loads on the primary and secondary column assembly posts of equal magnitude but opposite direction, so the changes in negative-stiffness effect for the primary and secondary column assemblies cancel, and the net change in horizontal stiffness of the column assembly pair is zero. As a fourth example, consider primary and secondary column assembly springs of equal vertical stiffness but posts of different length. A change in weight load on the column assembly pair will produce changes in vertical compressive loads on the rods of equal magnitude but opposite direction, so the negative-stiffness effect for the column assembly with smaller post length will dominate. Thus, for equal vertical spring stiffnesses, if the primary column assembly has the smaller post length, the net change in horizontal stiffness for an increase in weight load on the column assembly pair will be negative; if the secondary column assembly has the smaller post length, the net change in horizontal stiffness for an increase in weight load on the column assembly pair will be positive.

It should be appreciated that the isolation system should be designed with sufficient vertical preload and vertical flexibility in the column assemblies so that the largest change in weight load on a column assembly pair will not reduce the vertical compressive load on a secondary column assembly below zero. This behavior has been assumed for the foregoing examples.

The above examples also show the numerous variables that the design/engineer has at his disposal when designing a system made in accordance with the present invention for a particular application. The present invention provides for numerous combinations of structural elements that can be implemented to achieve a desired range of system performance.

It is not necessary for each primary column assembly to be paired with a secondary column assembly, as shown in FIGS. 1 and 2. For example, as an alternative, only one secondary column assembly located at or near the center of intermediate platform 20 could be used with the three primary column assemblies 16. As another alternative, only one primary column assembly located at or near the center of intermediate platform 20 could be used with the three secondary column assemblies 18.

Figure 3:
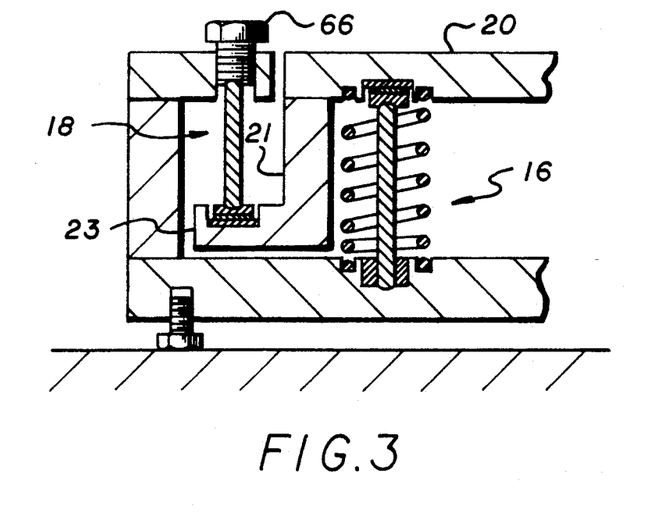
FIG. 3 is a partial cross-sectional side view of another embodiment of a horizontal-motion isolator made in accordance with the present invention.
Figure 4:
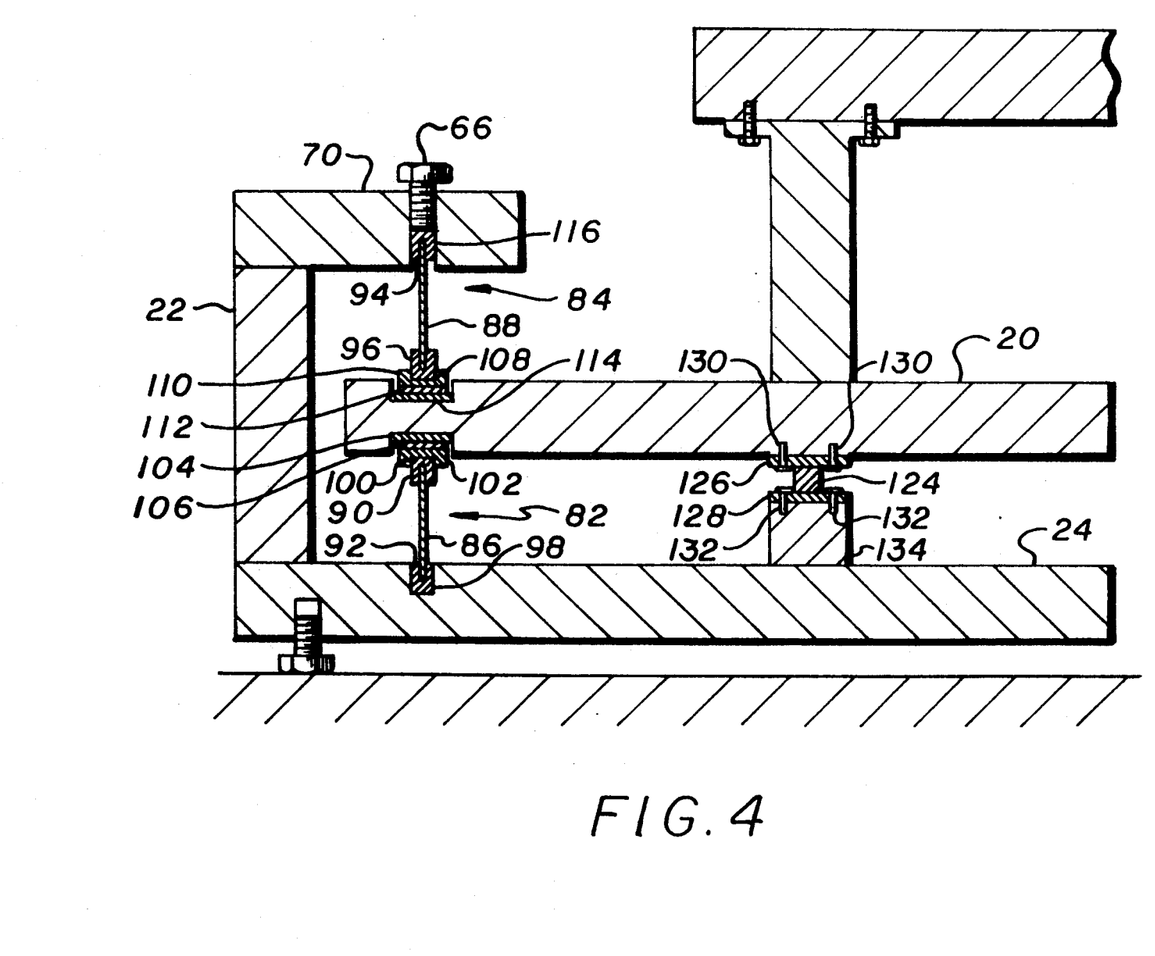
FIG. 4 is a partial cross-sectional side view of another embodiment of a horizontal-motion isolator made in accordance with the present invention.

FIGS. 3 and 4 show other embodiments of horizontal-motion isolators made in accordance with the present invention. FIG. 3 is a partial cross- o sectional side view of a low-profile variation of the isolator illustrated in FIGS. 1 and 2. This isolator and the isolation system in which it is used have the same general arrangement as the isolator and isolation system illustrated in FIGS. 1 and 2, and the cross-sectional view of FIG. 3 corresponds to a view similar to the one taken along line 2—2 of FIG. 1. The embodiment of FIG. 3 also uses three pairs of primary column assemblies 16 and secondary column assemblies 18 (of which, only one pair is shown in FIG. 3), and the individual column assemblies 16 and 18 have the same structure as those shown in FIGS. 1 and 2 and described above. However, in the embodiment of FIG. 3, the secondary column assembly 18 is located adjacent to the primary column assembly 16 and 18, rather than above it. The lower end of column assembly 18 connects to the bottom section 23 of a support post 21 that connects to intermediate platform 20. The column assemblies 16 and 18 are operatively connected vertically in series, and loading screw 66 applies vertical compressive preload to the column assembly pair, as in the embodiment of FIGS. 1 and 2. This embodiment provides a more compact system which achieves the same results as the system shown in FIGS. 1 and 2.

FIG. 4 is a partial cross-sectional side view of another embodiment of a horizontal-motion isolator made in accordance with the present invention. This isolator and the isolation system in which it is used also have the same general arrangement as the isolator and isolation system of FIGS. 1 and 2, and the cross-sectional view of FIG. 4 corresponds to a view similar to the one taken along line 2—2 of FIG. 1. The primary and secondary column assemblies 82 and 84 utilize flexible column members 86 and 88, respectively, which act as beam-columns, such as steel rods which are inserted into and bonded to short cylindrical end fittings 90 and 92, and 94 and 96, respectively, also made of steel. The lower end fitting 92 on column member 86 is contained in and bonded to cavity 98 defined in base platform 24. The upper end fitting 90 on column member 86 is contained in and bonded to cavity 100 defined in lower plate 102 of bridge-bearing-type spring 104 located in cavity 106 defined in intermediate platform 20. The lower end fitting 96 on column member 88 is contained in and bonded to cavity 108 defined in upper plate 110 of bridge-bearing-type spring 112 located in cavity 114 defined in intermediate platform 20. The bridge-bearing-type springs 104 and 112 are basically the same as those shown in FIG. 2 and described above. The upper end fitting 94 on column member 88 is captured in opening 116 defined in top section 70 of support post 22 and contacts loading screw 66 that is threaded into opening 116. Loading screw 66 applies vertical compressive preload to column assemblies 82 and 84, loading column members 86 and 88, and springs 104 and 112. Damping in the isolator is provided by a cylindrical spring-damper element 124 made of a polymeric rubber-like material, that is bonded to plates 126 and 1 28 Plate 126 is attached to platform 20 with bolts 130, and plate 128 is attached with bolts 132 to support post 134 on platform 24. The springs 104 and 112 are Very stiff vertically compared with the vertical stiffness of the spring-damper element 124, and the isolator is assembled so that little or no vertical load is applied to the spring-damper element 124. Consequently, changes in weight load applied to the isolator also cause little or no vertical load on the spring-damper element.

Positive horizontal-stiffness in the isolator in response to relative horizontal displacement between intermediate platform 20 and base platform 24 results from the flexible column members 86 and 88 and the spring-damper element 124. Negative horizontal stiffness which subtracts from the positive stiffness results from the beam-column effect produced in the vertically loaded column members 86 and 88. Weight load from the payload (not shown) is applied to intermediate platform 20, increasing the vertical compressive load on column member 86 and decreasing the vertical compressive load on column member 88. Similarly, an increase in weight load on the isolator increases the vertical load on column member 86 and decreases the vertical load on column member 88, and the relative changes in vertical loads on the column members depend on the relative vertical stiffnesses of the springs 104 and 112, as shown by examples given above with the isolator of FIGS. 1 and 2. The 10 changes in vertical compressive loads on the column members 86 and 88 cause changes in the negative-stiffness effects from the column members, but in opposite directions. The net change in isolator horizontal-stiffness due, for example, to an increase in weight load on the isolator will be positive, negative or zero depending on the relative vertical stiffnesses of the springs 104 and 112, the relative horizontal stiffnesses of the unloaded column members 86 and 88, and the relative critical buckling loads of the column members 86 and 88.

One or both of the springs in the column assembly pairs illustrated in the embodiments of FIGS. 2, 3 and 4 could be eliminated since the flexible columns 86 and 88 in FIG. 4 and the column assembly posts in FIGS. 2 and 3 have some vertical flexibility. The added vertical flexibility of the springs makes the preload and the system behavior less susceptible to dimensional changes such as those due to temperature changes. If the spring in the secondary column assembly is eliminated, the spring in the primary column assembly can still provide sufficient vertical flexibility to accommodate dimensional changes. It is also possible for the column assembly pair to be designed so that the net stiffness of a column assembly pair changes in the same proportion as the change in weight load supported by the column assembly pair, but the design is more constrained.

The horizontal-motion isolation system 10 illustrated in FIGS. 1 and 2 shows the payload platform 14 rigidly connected to intermediate platform 20. The resulting system is stiff in the vertical direction and therefore isolates a payload only from horizontal-motion vibrations. As an alternative, vertical-motion isolators such as those as described in my co-pending applications could be supported on the intermediate platforms 20, and the vertical-motion isolators could support the payload platform 14 or they could support the payload itself. The resulting vibration isolation system could then isolate the payload from both vertical and horizontal vibrations, and the horizontal-motion isolation system could passively accommodate changes in weight load with little or no degradation in the horizontal-motion isolation system performance. The vertical-motion isolators could also accommodate changes in weight load using the means described in my co-pending application, Ser. No. 395,093.

Figure 5:
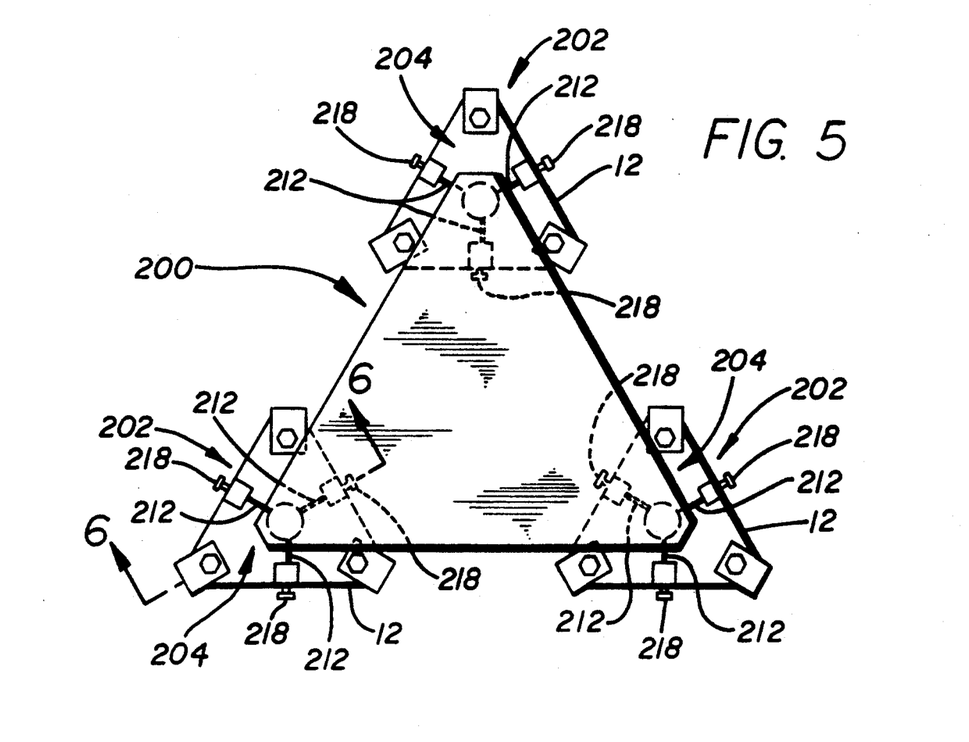
FIG. 5 is a plan view of an embodiment of an omnidirectional vibration isolation system made in accordance with the present invention.
Figure 6:
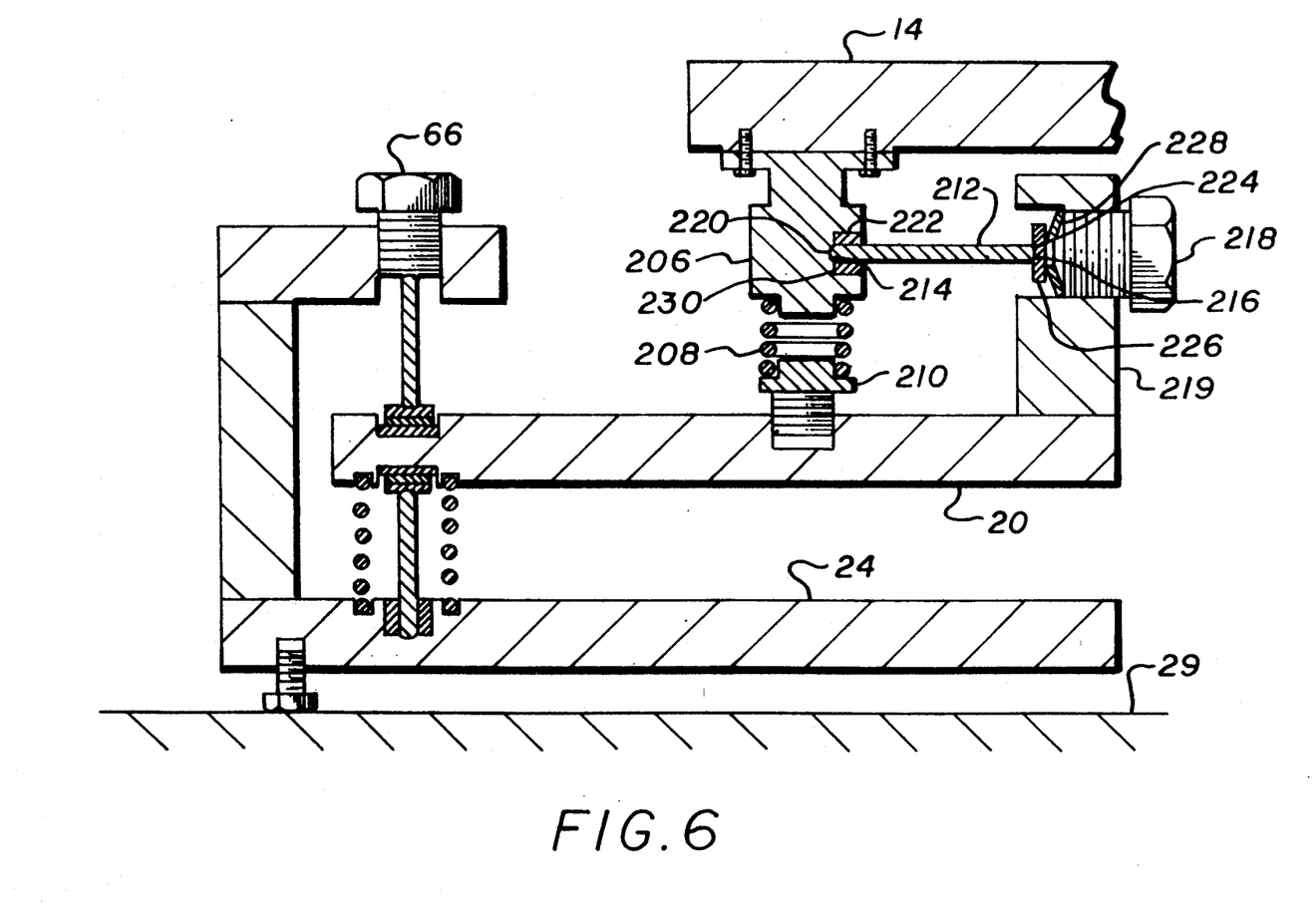
FIG. 6 is an expanded partial cross-sectional side view of the embodiment shown in FIG. 5 taken along line 6—6.

This is the basis for the omnidirectional vibration-isolating suspension system 200 illustrated in FIGS. 5 and 6 and made in accordance with the present invention. The suspension system 200 utilizes three composite suspension devices or isolators 202 that resiliently support a payload platform 14. The composite isolators 202 utilize a horizontal-motion isolator 12 having the same configuration as that shown in FIGS. 1 and 2 connected vertically in series with a vertical-motion isolator 204 made in accordance with my invention as described in my co-pending applications. The vertical-motion isolators 204 support the payload platform 14 and are connected between payload platform 14 and intermediate platform 20. The vertical-motion isolator 204 utilizes a central hub 206 supported on a coil spring 208 that connects to a screw translator 210 threaded into platform 20. The control hub 206 is also connected to a negative-stiffness and damper mechanism that includes three radially oriented and radially compressed posts 212 with spherical ends 214 and 216 that are operatively connected between the central hub 206 and loading screws 218 that are threaded into support posts 219 on platform 20. The inner end 214 of post 212 is captured in a shallow spherical cavity 220 defined in the central hub 206 at the inside surface of cavity 222 defined in the central hub 206. The outer end 216 of post 212 is captured in a shallow spherical cavity 224 defined in washer 226 contained between post 212 and Belleville spring 228 that is contained between washer 226 and loading screw 218. An annular damper element 230 made of a polymeric rubber-like material is contained in and bonded to the walls of cavity 222 and is bonded to post 212. Tilting of the radially compressed posts 212 in response to relative vertical motion between payload platform 14 and intermediate platform 20 produces negative vertical stiffness that subtracts from the positive stiffness of support spring 208 creating low vertical stiffness between payload platform 14 and base platform 24, effectively suppressing the transmission of vertical vibrations between the payload and the base. The tilting of posts 212 also deforms damper elements 230 dissipating energy through hysteresis and effectively limiting vertical resonant responses of the isolation system. Changes in weight load on payload platform 14 are accommodated in the vertical-motion isolator 204 by adjusting the screw translator 210 so as to maintain the central hub 206 in a vertical equilibrium position relative to intermediate platform 20 so that ports 212 are substantially horizontal. Since the radial stiffness of posts 212 and Belleville springs 228 will be large compared with the horizontal stiffness of horizontal-motion isolator 212, the vertical-motion isolator 204 will act like a rigid connection between payload platform 14 and intermediate platform 20 in response to horizontal vibrations, and the horizontal-motion isolation system will function as described above in 10 connection with FIGURES 1 and 2.

Consider, now, the use of the isolation system illustrated in FIGS. 1 and 2 for retrofitting an existing vibration-isolating suspension system, and for this purpose consider that payload platform 14 is part of the existing suspension system (not shown) that connects between this platform and foundation 29. Consider also that this existing suspension isolates the payload against vibrations in any horizontal direction so that the existing system exhibits positive stiffness for any horizontal displacement of platform 14 relative to foundation 29. By attaching the isolators 12 to platform 14 as illustrated in FIGS. 1 and 2, negative horizontal stiffness from the preloaded pairs of column assemblies 16 and 18 reduces the positive stiffness of the existing suspension system and damping from the spring-damper elements 36 adds damping to the existing system. The isolator 12 can be designed so that with the design preload applied by loading screws 66, flange 28 on post 26 just meets platform 14 so that the isolator 12 can be attached to platform 14 without loading the platform or displacing the platform from its existing equilibrium condition. If the isolator 12 is attached to platform 14 before applying the preload with loading screw 66, leveling screws 30 can be used to compensate for the lowering of platform 20 from compression of springs 34 by raising base 24 to keep the isolator from displacing platform 14. Under these conditions, the primary column assembly 16 does not support any weight load and the negative stiffness effect is due only to the vertical compressive preload on the column assembly pair. Now if the weight load on the existing suspension system changes, the retrofit system can accommodate the changes and passively change the horizontal-stiffness of the combined system in a prescribed manner.

With sufficient preload applied by loading screw 66 the horizontal stiffness of the existing suspension system can be made arbitrarily low. Also, by subtracting all of the horizontal stiffness in the combined system except the stiffness of the spring-damper elements 36, the loss factor for the combined system in response to horizontal vibrations will be the loss factor of the spring-damper material. By subtracting even more stiffness so that the horizontal stiffness of the combined system is less than the stiffness of the spring-damper elements 36, the loss factor for the combined system in response to horizontal vibrations will exceed the loss factor of the spring-damper material.

For retrofit applications in which the spring-damper element 36 is a viscoelastic material and the existing suspension system does not exhibit creep, coil springs 38 are not needed since the positive stiffness from the existing suspension can be used to prevent the potential creep instability described above. Also, if the retrofit is only for reducing the stiffness of an existing suspension system, spring-damper element 36 is not needed. Of course, as the stiffness of the existing system is reduced, damping inherent in the existing system will be increased.

For the more general retrofit application where the existing suspension system isolates the payload from omnidirectional vibrations, the isolation system illustrated in FIGS. 5 and 6 can be used. Here the composite suspension devices or isolators 202 would be used as the retrofit devices that would connect between a payload platform 14, which for this discussion should be considered part of the existing suspension system, and foundation 29. The composite retrofit device 202 would be designed and adjusted so that with the required preload from loading screws 66 the composite retrofit device would have the proper height to just meet platform 14 so that it could be attached without loading or displacing the existing suspension system. The intermediate platform 20 could be restrained from moving horizontally relative to base platform 24 while the retrofit device 202 is preloaded with loading screws 66 and adjusted to the proper height, and the restraint could then be released after the retrofit device 202 is connected to payload platform 14. The vertical-motion isolator 204 could be preloaded with loading screws 218 after the retrofit device 202 is connected to the payload platform 14. Preloading the horizontal-motion and vertical motion negative-stiffness mechanisms to produce negative stiffness does not exert a net load on the existing system provided the systems are properly aligned and the negative stiffnesses do not exceed the positive stiffnesses in the combined system. As in the horizontal-motion retrofit application described above, the composite retrofit device 202 does not support any weight load when it is connected to the existing suspension system that is in an initial equilibrium condition as explained above. If the weight load on the existing suspension system changes, the horizontal stiffness of the retrofit system will change passively in a prescribed manner as described above, and the vertical-motion isolator 204 in the retrofit system can be adjusted to maintain its equilibrium position by adjusting the screw translator 210. If necessary, loading screws 218 could also be adjusted to change the vertical stiffness of the combined system. With loading screws 66 and 218, both the horizontal and the vertical stiffnesses of the retrofit system can be made arbitrarily small and substantial damping can be added to control both vertical and horizontal retrofit system resonances.

Figure 7:
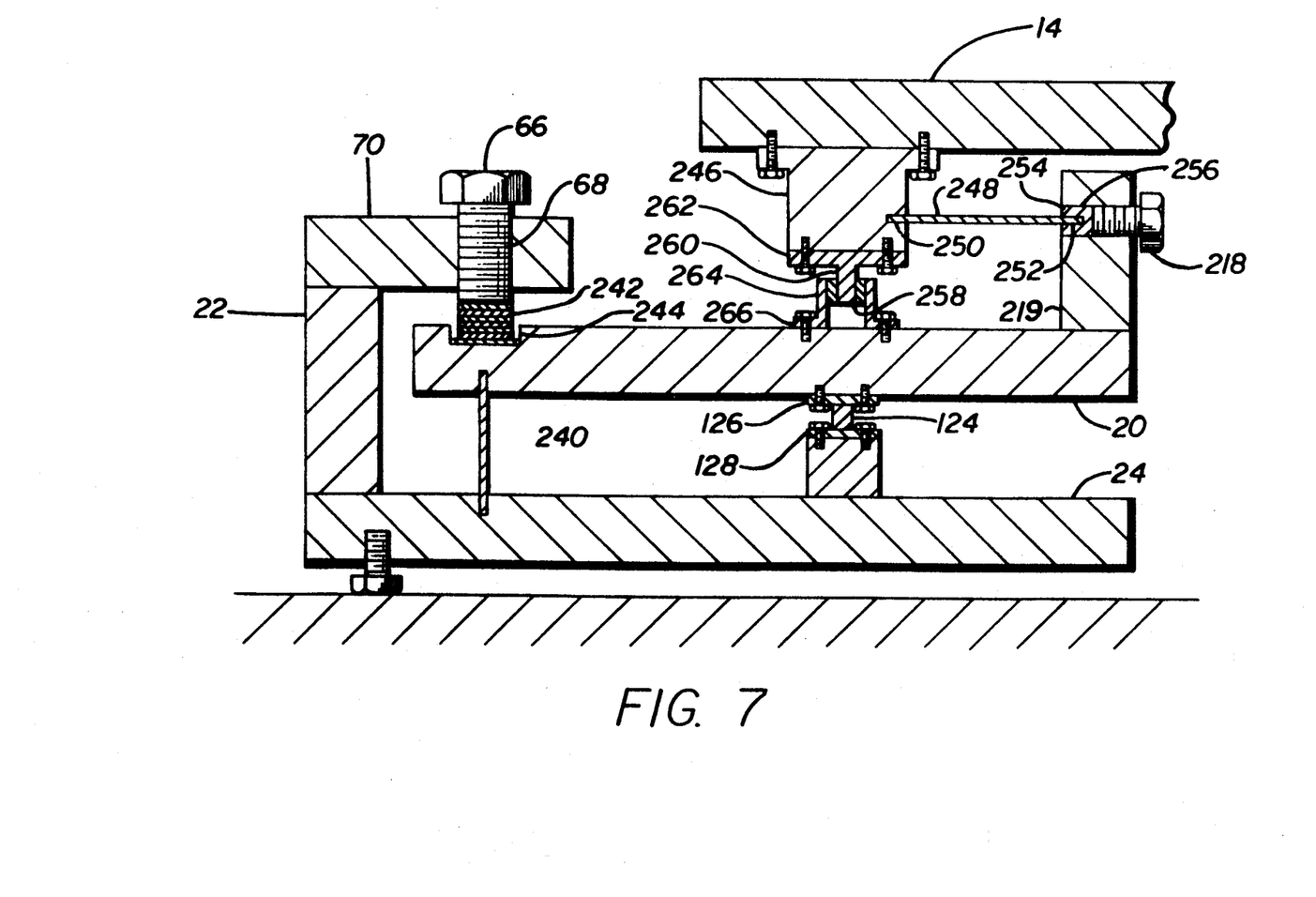
FIG. 7 is a partial cross-sectional side view of a device for retrofitting an existing omnidirectional vibration-isolating suspension system, made in accordance with the present invention.

FIG. 7 shows another embodiment of a composite device for retrofitting an existing omnidirectional vibration-isolating suspension system in which the weight load does not change for reducing the stiffness and adding damping to the existing system. This device is an alternative to the embodiment illustrated in FIGS. 5 and 6 and has the same general configuration and functions in the same manner. The partial cross-sectional side view illustrated in FIG. 7 is a view of the alternative system which is similar to the view taken along line 6—6 in FIG. 5. In the embodiment of FIG. 7 a beam-column 240 rigidly connected to intermediate platform 14 and base platform 24 is used as the primary structure in the horizontal-motion device, and the secondary structure is a bridge-bearing-type spring 242 contained in cavity 244 defined in intermediate platform 20. Loading screw 66 threaded into opening 68 in top section 70 of support post 22 applies vertical compressive preload to the spring 242 and beam-column 240. A horizontal-motion damper element 124 bonded to plates 126 and 128 is operatively connected between platforms 20 and 24. The vertical-motion device includes a central hub 246 connected to a negative-stiffness mechanism in the form of three radially oriented and radially compressed beam-columns 248 that are rigidly connected at their inner ends 250 to central hub 246, and at their outer ends 252 to end fitting 254 which is contained in opening 256 in support post 219. Loading screw 218 threaded into opening 256 applies radial compressive preload to beam-column 248. A vertical-motion damper element 258 bonded between rod 260 with flange 262 and cylinder 264 with flange 266 is operatively connected between central hub 246 and platform 20.

Since the weight load on the existing suspension system is not changing, the primary and secondary structure pair is only needed to produce a particular horizontal negative-stiffness effect which is achieved by loading the beam-column 240 sufficiently above its critical buckling load using loading screw 66. This negative-stiffness effect must be sufficient to exceed the positive horizontal stiffness of the unloaded beam-columns 240, the bridge-bearing-type springs 242 and the damper element 124 in order to reduce the horizontal stiffness of the existing suspension system. Therefore, the secondary structure, in the form of the bridge-bearing-type spring 242 in this embodiment, must be sufficiently stiff axially to support the required vertical compressive load and sufficiently flexible in transverse shear so that its horizontal stiffness can be exceeded by the negative-stiffness effect from the primary structure, in the form of the beam-column 240 in this embodiment. Also, since the vertical-motion device does not support any weight load, no support spring or translator under the spring is required. If added damping were not required the damper elements 124 and 258 with their associated structure could also be eliminated. The resulting composite retrofit device would then consist of only negative-stiffness mechanism for reducing the horizontal and the vertical stiffnesses of the existing suspension.

It should be appreciated that primary and secondary structures could also be connected directly to a platform or similar structure of an existing system being retrofitted, thus eliminating the need for a separate, intermediate platform. In such a case, only the base structure along with the loading means, primary and secondary structures would be needed to retrofit the existing system. Also, damping 15 elements and additional springs as shown in the foregoing embodiments could be added to the existing system. An arrangement of these structures in this manner would not depart from the spirit and scope of the present invention.

The column assemblies or primary and secondary structures utilized in accordance with the present invention can be made from a number of suitable materials, for example, structural materials such as steel and aluminum alloys, non-metallics and other structural materials that have appropriate elastic and strength properties. A variety of high damping polymeric rubber-like materials are available in the market and can be used for the damping elements shown in the various embodiments. Two examples are the ISODAMP C-1000 Series Thermoplastic, available from EAR Division, Cabot Corporation, Indianapolis, Ind. and described in MDS-19. Other suitable materials include the ISOLOSS HD Elastomers, available from the EAR Specialty Composite Corporation, Indianapolis, Ind. and described in the EAR Bulletin "Introducing ISOLOSS" and MDS-56, ISOLOSS HD. Any other suitable rubber or rubber-like materials which exhibit the necessary damping properties needed in the embodiments of the present invention can also be utilized.

While several particular forms of the invention have been illustrated and described, it will be apparent that various modifications can be made without departing from the spirit and scope of the present invention. Accordingly, it is not intended that the invention be limited, except by the attached claims.

What is claimed is:

1. A vibration-isolating suspension system for supporting an object having changing mass in an acceleration field having an axial direction and maintaining the object in an equilibrium position relative to a base structure while suppressing the transmission of vibratory motion in any transverse direction between the object and the base structure, comprising:

at least two support structures operatively connected axially in series with each other and the base structure, each of said support structure having a negative-stiffness effect in response to axial compressive loading for reducing the transverse stiffness of each said support structure;

a platform for supporting the object disposed between and connected to each of two support structures;

means exhibiting positive transverse stiffness operatively connected between the object and the base structure; and means for applying axial compressive preload to said support structures.

2. The system as defined in claim 1 further including a suspension device operatively connected axially in series between the object and said platform for supporting the object and maintaining the object in an equilibrium position relative to said platform while suppressing the transmission of vibratory motion in the axial direction between the object an said platform.

3. The system as defined in claim 2 wherein said suspension device includes a negative-stiffness mechanism for reducing the axial stiffness of said suspension device in response to compressive load applied to at least a portion of said suspension device, and means for applying the compressive load.

4. A system for retrofitting an existing vibration-isolating suspension system in order to reduce the stiffness and add damping so as to improve the performance of the existing system, wherein the existing system supports an object having mass in an acceleration field having an axial direction and maintains the object in an equilibrium position relative to a foundation while suppressing at least a portion of the transmission of vibratory motion in any transverse direction between the object and the foundation, comprising:

at least one retrofit device operatively connected between the object and the foundation, comprising:

a base structure connected to the foundation;

at least two support structures operatively connected axially in series with each other and said base structure, at least one of said support structures having a negative-stiffness effect in response to axial compressive loading for reducing the transverse stiffness of said one support structure; and a platform disposed between and connected to said support structures, said platform being operatively connected to the object; and means for applying axial compressive preload on said support structures.

5. The system as defined in claim 4 wherein both support structures have a negative-stiffness effect in response to axial compressive loading for reducing the transverse stiffness of said support structures and wherein at least one of said support structures is elastic.

6. The system as defined in claim 4 further including a second retrofit device operatively connected axially in series between the object and said platform, said second retrofit device comprising:

a negative-stiffness mechanism for reducing the axial stiffness of said second retrofit device in response to compressive load applied to at least a portion of said second retrofit device; and means for applying the compressive load.

7. The system as defined in claim 4 further including means for adding damping to said retrofit device wherein said means for adding damping dissipates energy in response to vibratory motion between the object and the foundation.

8. In a vibration-isolating suspension system that supports an object having changing weight relative to a base structure on a support structure having a negative-stiffness effect in response to vertical compressive load that reduces the horizontal stiffness of the support structure, the improvement comprising the addition of:

means for operatively connecting a second support structure vertically in series with the first mentioned support structure and vertically between the object and the base structure wherein the second support structure has a negative-stiffness effect in response to vertical compressive load that reduces the horizontal stiffness of the second support structure; and means for applying vertical compressive preload to the first mentioned and second support structures.

9. In a retrofit device for reducing the horizontal stiffness of an existing vibration-isolating suspension system that supports an object relative to a base structure, wherein the retrofit device utilizes a support structure operatively connected between the object and the base structure having a negative-stiffness effect in response to vertical compressive load that reduces the horizontal stiffness of the support structure, the improvement comprising the addition of:

a second support structure operatively connected vertically in series with the first mentioned support structure and operatively connected vertically in series with the base structure; and means for applying vertical compressive preload to the first mentioned and said second support structures.

10. A method for reducing the transmission of horizontal vibrations between an object having changing weight and a base structure comprising the steps of:

supporting the object on a first support structure having a negative-stiffness effect in response to vertical compressive load that reduces the horizontal stiffness of the first support structure;

connecting a second support structure having a negative-stiffness effect in response to vertical compressive load that reduces the horizontal stiffness of the second support structure operatively vertically in series with the first support structure, and operatively vertically between the object and the base structure; and applying vertical compressive preload to the first and second support structures.

11. A method for retrofitting a vibration-isolating suspension system that supports an object relative to a base structure wherein the retrofitting reduces the horizontal stiffness of the system and adds damping to limit horizontal resonant responses of the system without displacing the system from its equilibrium position, comprising the steps of:

operatively connecting at least two support structures vertically in series with each other, wherein at least one of the support structures has a negative-stiffness effect in response to vertical compressive load that reduces its horizontal stiffness;

operatively connecting each support structure vertically in series with the base structure;

operatively connecting the object horizontally to a point where the two support structures are connected with each other; and applying vertical compressive load to the two support structures.

* * * * *